US 6,662,436 B1

(12) United States Patent
Andulics et al.

(10) Patent No.: US 6,662,436 B1
(45) Date of Patent: Dec. 16, 2003

(54) SYSTEM FOR ASSEMBLING A BLOWER WHEEL

(75) Inventors: Joseph H. Andulics, Elyria, OH (US); Mark S. Resar, Wellington, OH (US)

(73) Assignee: Beckett Air Incorporated, North Ridgeville, OH (US)

( * ) Notice: Subject to any disclaimer, the term of this patent is extended or adjusted under 35 U.S.C. 154(b) by 108 days.

(21) Appl. No.: 10/074,344

(22) Filed: Feb. 12, 2002

(51) Int. Cl.[7] .......................... B23P 21/00; B23P 19/00; B23C 1/00
(52) U.S. Cl. ................................ 29/709; 29/700; 29/54
(58) Field of Search .......................... 29/700, 701, 709, 29/715, 238, 240, 283.5, 889, 455.1, 465, 505, 508, 515, 520, 50, 52, 53, 54; 416/178

(56) References Cited

U.S. PATENT DOCUMENTS

| | | | |
|---|---|---|---|
| 3,186,068 A | * 6/1965 | Austin et al. | 29/889.4 |
| 3,211,364 A | * 10/1965 | Wentling et al. | 416/178 |
| 3,711,914 A | 1/1973 | Baker | |
| 4,361,413 A | * 11/1982 | Toda | 198/468.4 |
| 6,220,818 B1 | 4/2001 | Andulics et al. | |
| 6,427,302 B2 | * 8/2002 | Piantoni et al. | 29/243.5 |

\* cited by examiner

*Primary Examiner*—John C. Hong
(74) *Attorney, Agent, or Firm*—Eschweiler & Associates, LLC

(57) ABSTRACT

The present invention is directed to a machine and a method for assembling blower wheels. The machine comprises a drive motor rotatably coupled to a first die, whereon a plurality of blower wheel components reside. A second die is oppositely disposed from the first die, and is operable to engage one or more of the plurality of blower wheel components. A transfer gear assembly rotatably couples the first die and the second die, wherein a rotation of the first die generally transfers to the second die, and wherein the rotation of first die and the second die is generally synchronized. A two-stage press is coupled to the first die and the second die, and is operable to axially compress the blower wheel components between the first die and the second die. A deforming member is operable to deform the hub during the compression of the blower wheel components. One or more springs couple the second die to the press, wherein the second die is operable to axially translate with respect to the press.

14 Claims, 8 Drawing Sheets

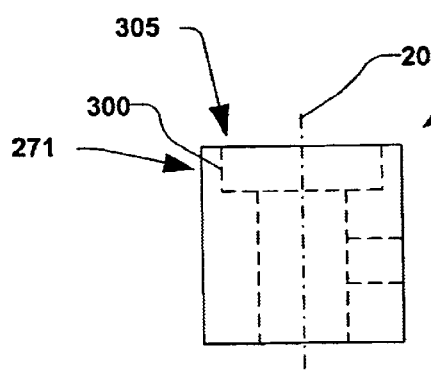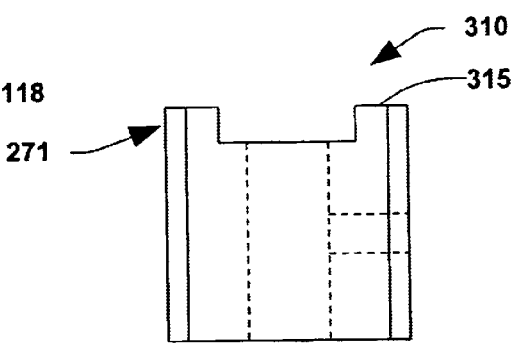
FIG. 7A  FIG. 8A
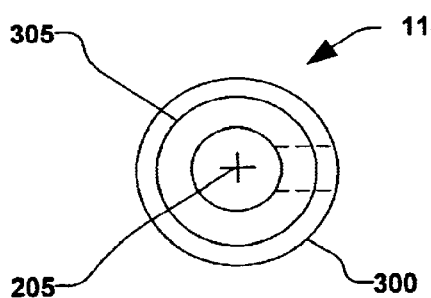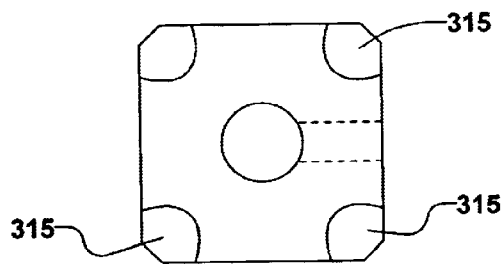
FIG. 7B  FIG. 8B

US 6,662,436 B1

SYSTEM FOR ASSEMBLING A BLOWER WHEEL

TECHNICAL FIELD OF INVENTION

The present invention relates to a machine for assembly a blower wheel assembly and methods of manufacturing the same. In particular, the invention relates to a machine for assembling a blower wheel assembly with a ring, a cylindrical blade strip, a backplate, and a hub wherein the ring and backplate are securely attached to the cylindrical blade strip, and the hub is securely attached to the backplate of the blower wheel assembly.

BACKGROUND OF THE INVENTION

FIG. 1 illustrates a prior art blower wheel comprising a blade strip assembly stamped from a continuous sheet of metal. The blade strip assembly permits a simplified manufacturing process for assembling the blower wheel, as compared to other types of blower wheels comprising separate, individual blades. The blade strip assembly is formed into a cylinder, and placed into a blower wheel assembly machine, wherein the cylinder is rotated while a ring is crimped to one end of the cylinder and a backplate is crimped to another end of the cylinder. A hub is furthermore attached to the backplate as a means for coupling the blower wheel to a shaft for rotation thereof.

The assembled blower wheel 100 comprises a plurality of blower wheel components 110, such as a ring 112, a blade strip cylinder 114, a backplate 116, and a hub 118. In the assembled blower wheel 100, the ring 112 is crimped onto a first end 120 of the blade strip cylinder 114, and the backplate 116 is crimped onto an opposing second end 122 of the blade strip cylinder while the blower wheel components 110 are rotated in a blower wheel assembly machine (not shown).

For clarity purposes, FIG. 2 more clearly illustrates the blower wheel 100 in an exploded view. A first flange 124 of the ring 112 is crimped onto the first end 120 of the blade strip cylinder 114, and a second flange 126 of the backplate 116 is crimped onto the second end 122 of the blade strip cylinder. In general, the ring 112 and the backplate 116 are crimped onto the cylindrical blade strip 114 while a machine rotates the blower wheel components 110 under moderate compression. The hub 118 is furthermore attached to the backplate 116 by deforming a lip 128 of the hub onto the backplate. This deformation typically is performed utilizing a pressing operation at a separate pressing machine, whereby the hub 118 is joined to the backplate 116.

FIG. 3 illustrates an exemplary prior art blower wheel assembly machine 150. The blower wheel assembly machine 150 comprises a base 152, whereon the blower wheel components 110 are placed for assembly. A motor 154 drives a shaft 155 attached to the base 152, thereby defining an axis 156, and resulting in a drive rotation $R_{DRIVE}$ of the shaft, base, and blower wheel components 110 about the axis. An actuator 157 applies a clamp 158 onto the blower wheel components 110 to radially and axially constrain the blower wheel components during assembly, thereby rotationally coupling the base 152 to the clamp 158 via the blower wheel components. The drive rotation $R_{DRIVE}$ is therefore transferred to the clamp 158 via the blower wheel components 110, thereby resulting in a driven rotation $R_{DRIVEN}$ of the clamp. During the rotation of the blower wheel components 110, one or more crimping assemblies 160 crimp the first flange 124 and the second flange 126 onto the blade strip cylinder 114, thereby generally attaching the ring 112 and the backplate 116 to the blade strip cylinder, respectively.

Coupling the base 152 to the clamp 158 via the blower wheel components 110, however, can cause a twisting of the blade strip cylinder 114 due to inertial forces from the clamp. Inertial forces from the clamp 158 and blower wheel components 110 must be overcome during both a start and a stop to the drive rotation $R_{DRIVE}$. Since the driven rotation $R_{DRIVEN}$ of the clamp is driven via the blower wheel components 110, the rotational inertia of the clamp 158 and blower wheel components 110 may cause an inequality between the drive rotation $R_{DRIVE}$ and the driven rotation $R_{DRIVEN}$, thereby causing an undesirable twisting of the blade strip cylinder 114.

In the industry, an emphasis has been placed on decreasing thicknesses of sheet metal used in the fabrication of the blade strip cylinder 114 to reduce material cost, as well as to decrease the overall weight of the blower wheel components 110. Furthermore, a discrepancy between the drive rotation $R_{DRIVE}$ rotation and the driven rotation $R_{DRIVEN}$ during starting and stopping of the rotation of the blower wheel components 110 will tend to increase when thinner sheet metals are utilized, thus increasing the undesirable effects of twisting the blade strip cylinder 114.

In the assembly of a blower wheel 100 of FIG. 1, a sturdy connection of the hub 118 to the backplate 116 is also necessary in order to avoid slippage of the backplate with respect to the hub during operation of the blower wheel, wherein the hub is attached to a rotating shaft (not shown). In the prior art, the hub 118 is typically pressed or deformed into the backplate 116 by a press as a separate operation to the assembly of the backplate and ring 112 to the blade strip cylinder 114. Operations at multiple assembly machines increases an amount of time required to produce the blower wheel 100, and increases a cost of the blower wheel.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a machine and a method of manufacturing blower wheels. The machine comprises a drive motor rotatably coupled to a first die, whereon a plurality of blower wheel components, such as a ring, a cylindrical blade strip, a backplate, and a hub, reside. A second die is oppositely disposed from the first die, and is operable to engage one or more of the plurality of blower wheel components. In accordance with one aspect of the present invention, a transfer gear assembly rotatably couples the first die and the second die together, wherein a rotation of the first die generally transfers to the second die via the transfer gear assembly, and wherein the rotations of the first die and the second die are generally synchronized.

In accordance with another aspect of the present invention, a press is coupled to the first die and the second die, wherein the second die is axially moveable with respect to the first die, and wherein the press is operable to axially compress the blower wheel components between the first die and the second die. A first crimping member and a second crimping member are further disclosed, wherein the first crimping member and the second crimping member are operable to crimp the ring and the backplate, respectively, to the cylindrical blade strip. Furthermore, a control system is disclosed for controlling the drive motor, the press, the first crimping member, and the second crimping member.

According to one exemplary aspect of the present invention, the second die further comprises a deforming member, wherein the deforming member is operable to deform the hub during the compression of the blower wheel components. According to another aspect of the invention, one or more springs couple the second die to the press, wherein the second die is operable to axially translate with respect to the press. According to yet another aspect of the present invention, the press further comprises a two-stage press, further comprising a first pressure stage and a second pressure stage. During the first pressure stage, a first compressive axial force is applied between the first die and the second die, and the first die and the second die are rotated, whereby the ring and the backplate are crimped onto the cylindrical blade strip via the first crimping member and the second crimping member. During the second pressure stage, a second compressive axial force is applied between the first die and a deforming member, wherein the hub is deformed via the deforming member.

In accordance with another aspect of the present invention, a method for assembling a blower wheel is disclosed, wherein a plurality of blower wheel components are placed on a first die, and a second die is placed on the blower wheel components. A first compressive axial force is applied on the first die, thereby generally compressing the blower wheel components. The first die and the second die are rotated via a drive motor, wherein the first die and the second die are rotatably coupled by a transfer gear assembly. A first flange of a ring and a second flange of a backplate are furthermore crimped onto a cylindrical blade strip via a first crimping member and a second crimping member, respectively, during the rotation. The drive motor further stops the rotation, and a press applies a second compressive axial force on the blower wheel components, wherein a hub is generally deformed onto the backplate.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 7A illustrates a side view of a hub according to the prior art.

FIG. 7B illustrates a plan view of the hub of FIG. 7A.

FIG. 8A illustrates a side view of another hub according to the prior art.

FIG. 8B illustrates a side view of the hub of FIG. 8A.

DETAILED DESCRIPTION OF THE INVENTION

Figure 1:
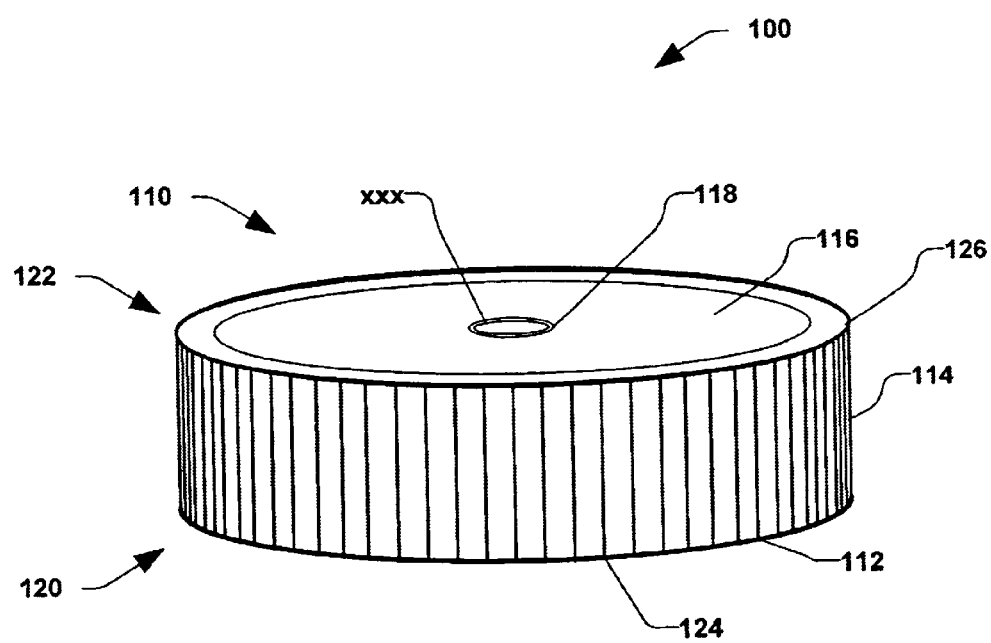
FIG. 1 illustrates a simplified perspective view of an exemplary blower wheel assembly of the prior art.

The present invention will now be described with reference to the drawings wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention.

Figure 4:
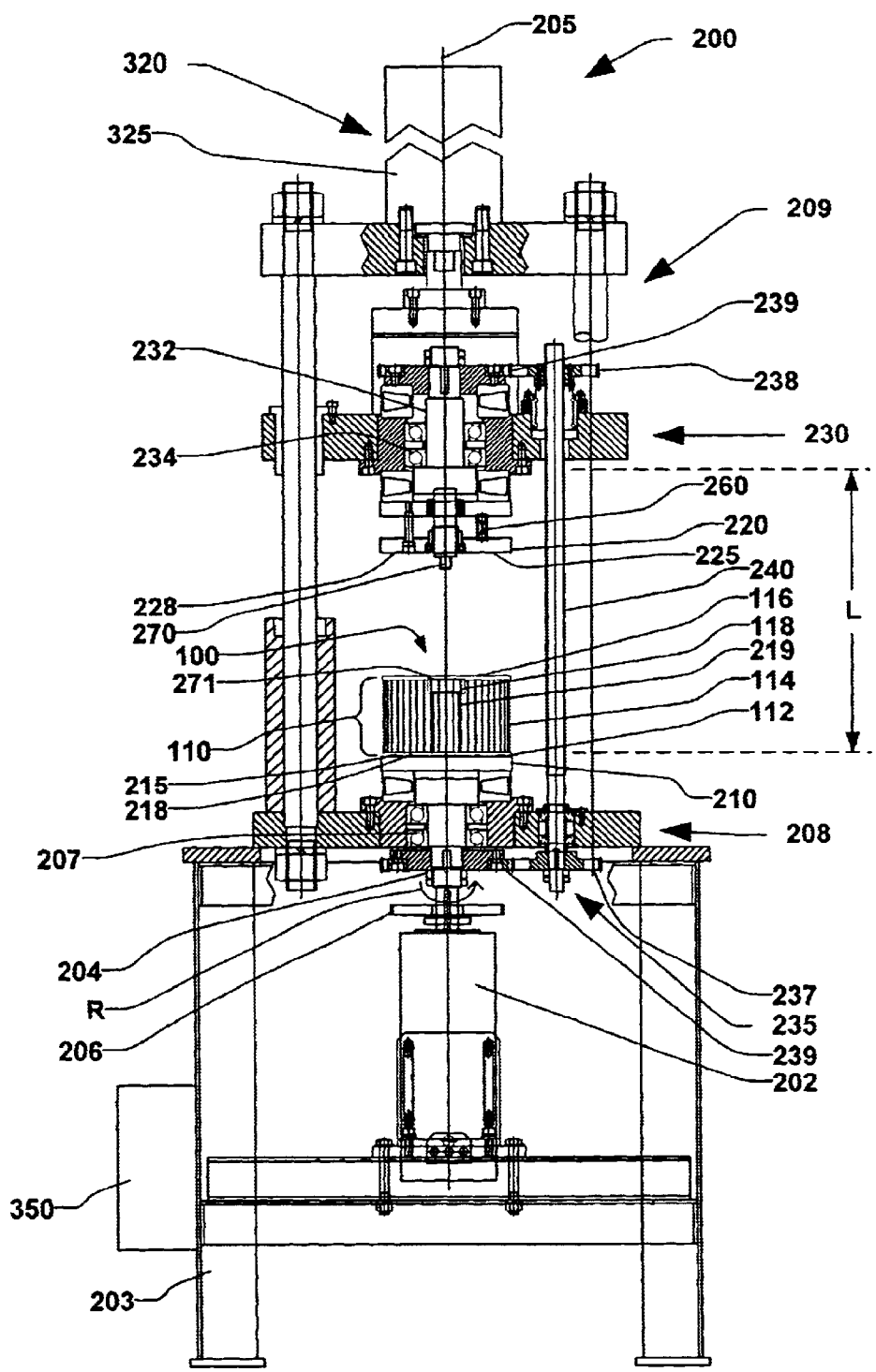
FIG. 4 illustrates an exemplary blower wheel assembly machine according to the present invention.

Referring now to the figures, several aspects of the present invention are presented. According to one aspect of the present invention, FIG. 4 illustrates a machine 200 for assembling a blower wheel 100. The machine 200 comprises a drive motor 202 mounted to a frame 203, wherein the drive motor is operable to rotate a drive shaft 204, thereby defining a rotation R of the drive shaft about an axis 205. The drive motor 202 and drive shaft 204, for example, are coupled via a belt and pulley system 206, wherein the drive motor is offset from the axis 205 via the belt and pulley system. One or more first bearings 207 rotationally couple the drive shaft 204 to a base portion 208 of a press 209, wherein the one or more first bearings generally fix an axial position (e.g., a vertical position) of the drive shaft with respect to the base portion. The base portion 208 of the press 209 is furthermore mounted to the frame 203.

Figure 2:
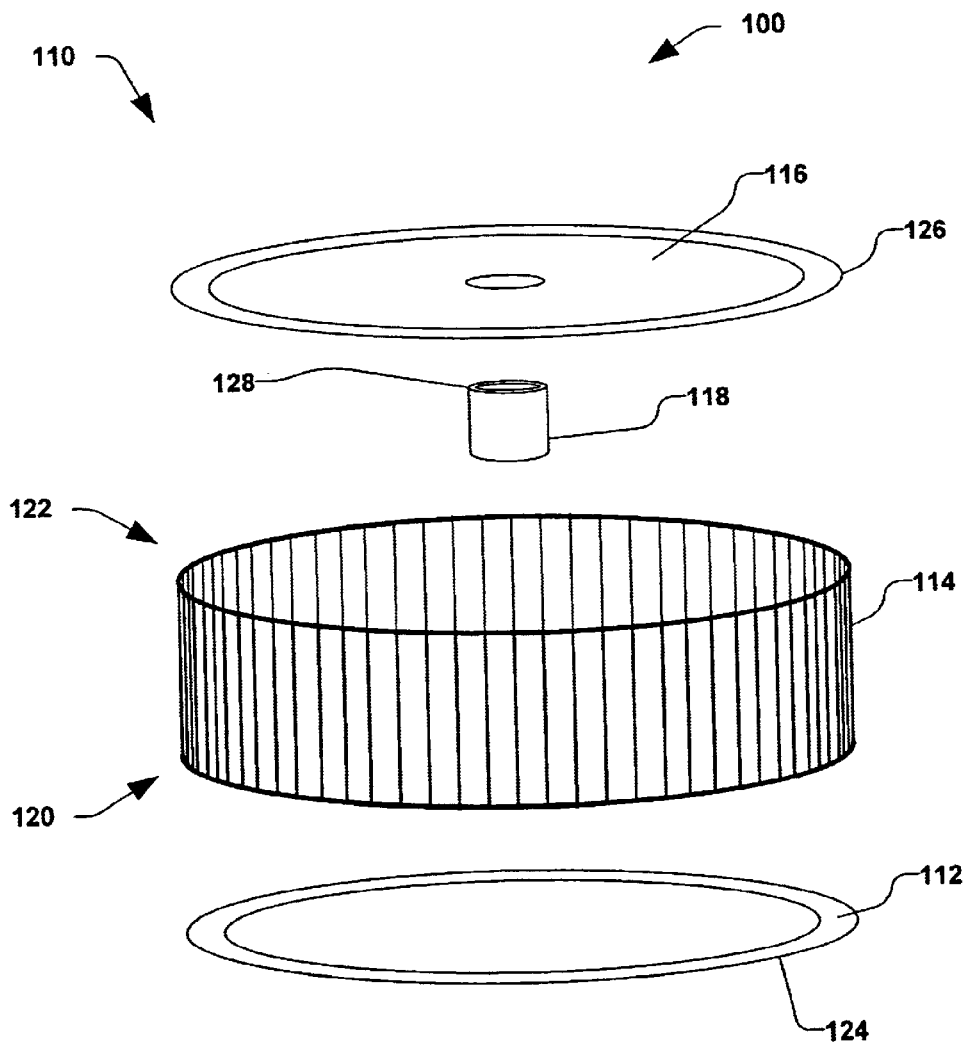
FIG. 2 illustrates a simplified exploded perspective view of an exemplary blower wheel assembly according to the prior art.
Figure 3:
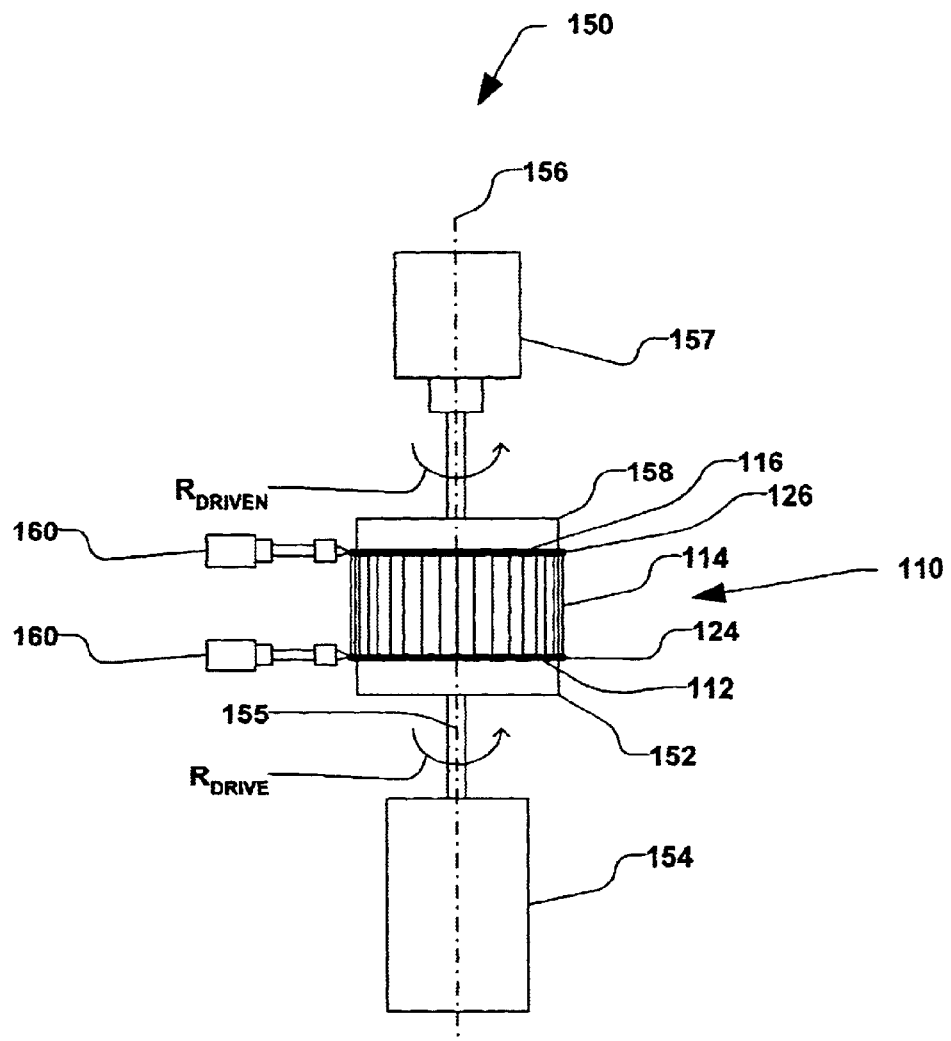
FIG. 3 illustrates an exemplary blower wheel crimping machine of the prior art.

According to one exemplary aspect of the present invention, a first die 210 is coupled to the drive shaft 204, wherein the rotation R of the drive shaft further rotates the first die about the axis 205. The first die 210 comprises a first surface 215, whereon one or more blower wheel components 110 reside. As illustrated in FIG. 2, the one or more blower wheel components 110 comprise, for example, a ring 112, a blade strip cylinder 114, a backplate 116, and a hub 118. Referring again to FIG. 4, the first surface 215, for example, comprises one or more first structures 218 generally configured to radially constrain one or more of the blower wheel components 110 which reside thereon. For example, the one or more first structures 218 comprise a first groove (not shown) circumferentially oriented about the first surface 215, wherein the first groove is operable to radially constrain the ring 112, and a post 219 protruding from the first surface, wherein the post is operable to radially constrain the backplate 116 and the hub 118.

The machine 200 further comprises a second die 220, wherein the second die comprises a second surface 225 oppositely disposed from the first surface 215. The second surface 225, for example, is operable to selectively engage one or more of the blower wheel components 110 residing on the first surface 215. For example, the second surface 225 comprises one or more second structures 228 such as a second groove (not shown) circumferentially oriented about the second surface 225, wherein the second groove is configured to further radially constrain one or more of the blower wheel components 110, such as the backplate 116.

According to one exemplary aspect of the present invention, the second die 220 is coupled to a second shaft 232, wherein one or more second bearings 234 rotatably couple the second shaft to an upper portion 230 of the press 209. Furthermore, the one or more second bearings 234 generally fix an axial position (e.g., a vertical position) of the second shaft 232 with respect to the upper portion 230 of the press 209. The upper portion 230 of the press 209 is furthermore axially moveable (e.g., vertically movable) along the axis 205. The second die 220 is therefore axially moveable with respect to the first die 210 via the press 209, and a compression of the blower wheel components 110 between the first die and the second die is generally permitted. Such a compression, for example, generally retains the blower wheel components 110 in an axial and radial position with respect to the axis 205 via the first structures 218 and the second structures 228.

According to another exemplary aspect of the present invention, a transfer gear assembly 235 rotationally couples the first die 210 and the second die 220, wherein the rotation R of the first die 210 is transferred to the second die 220 via the transfer gear assembly 235, such that the rotation of the first die and the rotation of the second die are synchronized with one another. Such a transfer of the rotation R via the transfer gear assembly 235 eliminates the deleterious effects of machines of the prior art, wherein machines of the prior art transferred a rotation from one die to another via the blower wheel components 110. The transfer gear assembly 235 comprises, for example, a lower spur gear 237, an upper spur gear 238, one or more ring gears 239, and a transfer shaft 240, wherein the lower spur gear, the upper spur gear, the ring gears, and the transfer shaft rotatably couple the first shaft 207 to the second shaft 232, thereby transferring the rotation R of the first die 210 to the second die 220.

In accordance with another exemplary aspect of the invention, the transfer shaft 240 further comprises a plurality of axial splines (not shown), wherein the upper portion 230 of the press 209 is operable to axially translate (e.g., vertically translate) along a length L of the transfer shaft, while maintaining the rotational coupling of the first die 210 and the second die 220. The upper spur gear 238 associated with the upper portion 230 of the press 209 is operable to engage the axial splines (not shown) throughout the translation of the length L of the transfer shaft 240. Such a translation substantially permits an axial translation (e.g., vertical translation) of the second die 220 with respect to the first die 210 while maintaining the rotational coupling of the upper spur gear 238 to the transfer shaft 240. While one exemplary transfer gear assembly is provided in FIG. 4, it should be understood that other structures may be employed to rotationally couple the first die 210 and second die 220 independent of the blower wheel components 110, and any such structure is contemplated as falling within the scope of the present invention.

Figure 5:
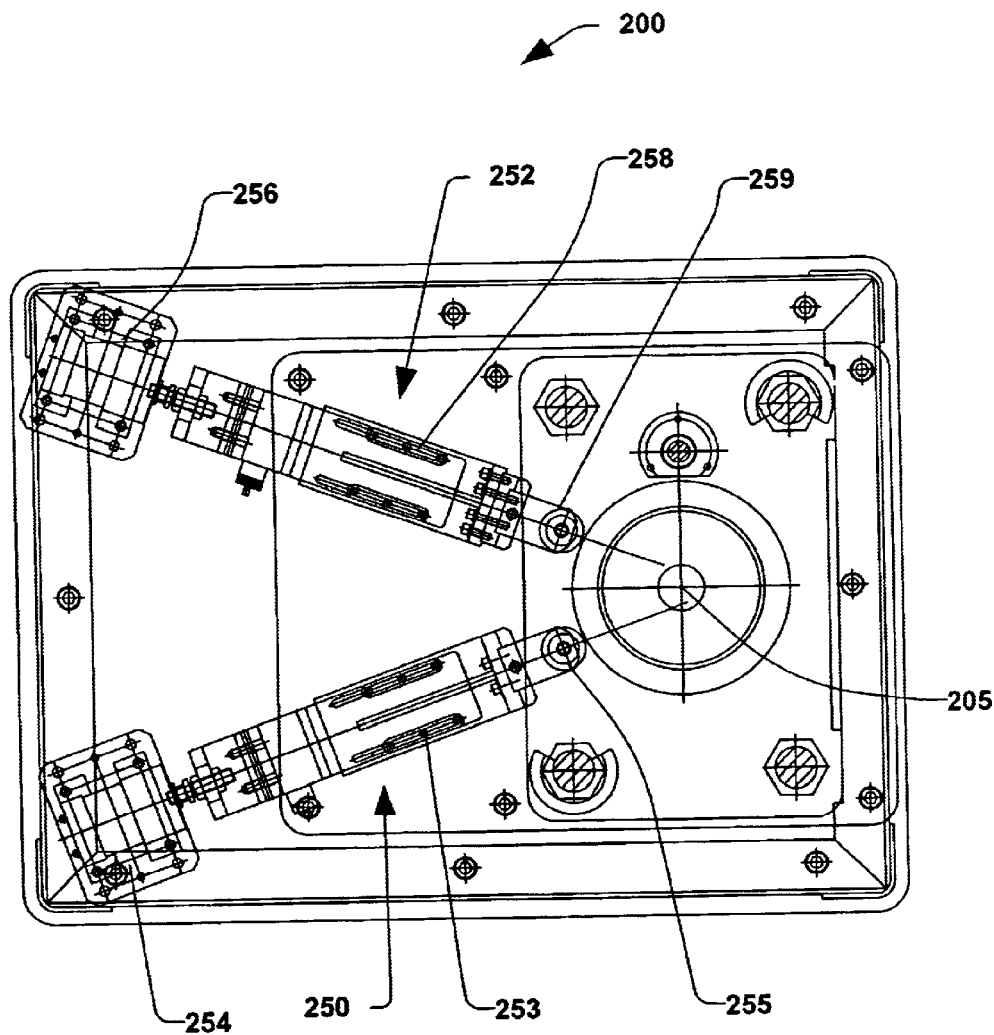
FIG. 5 illustrates a plan view of the blower wheel assembly of FIG. 4 according to the present invention.
Figure 6:
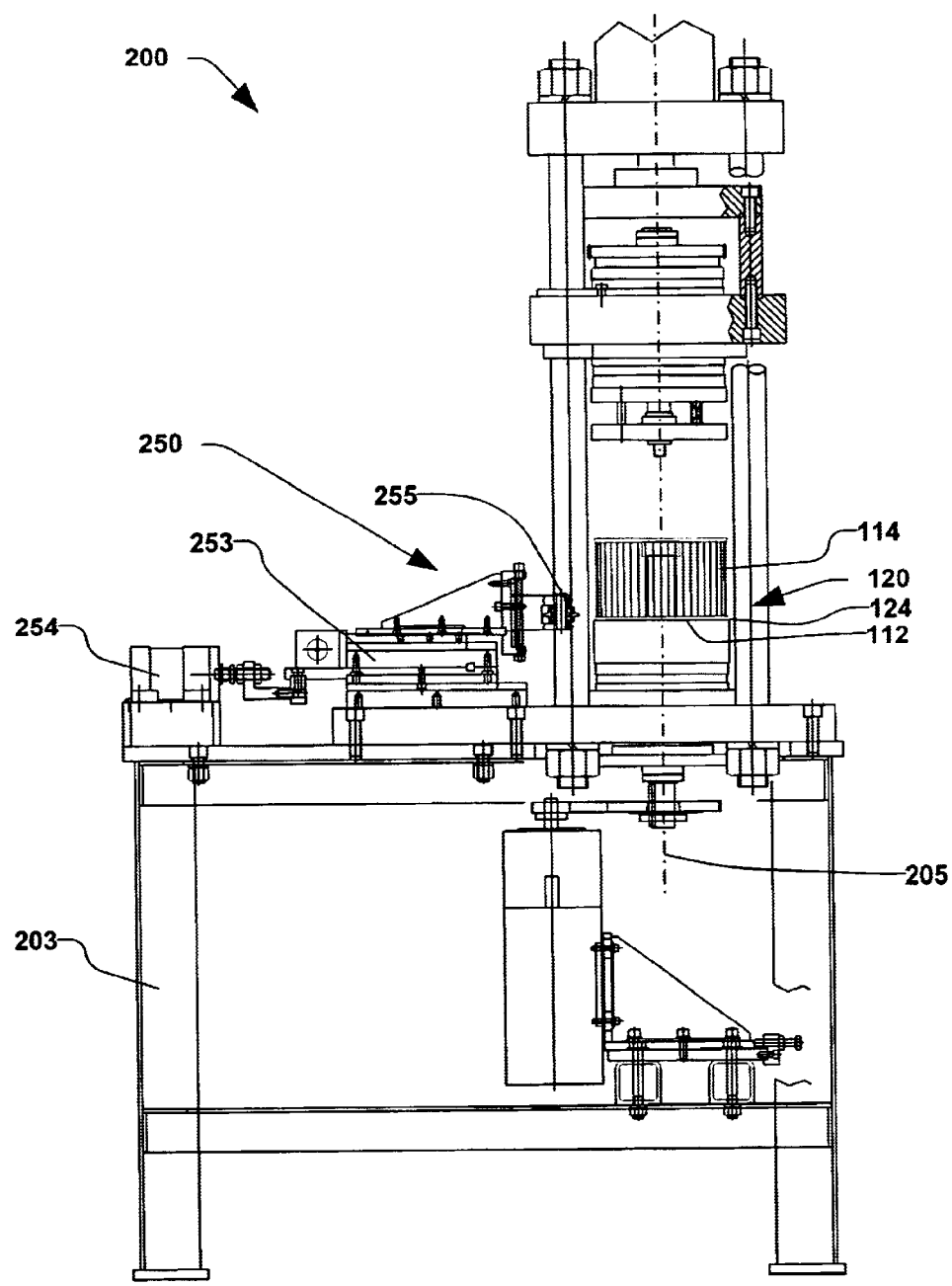
FIG. 6 illustrates a side view of the blower wheel assembly machine of FIGS. 4 and 5 according to the present invention.

Referring now to FIG. 5, a plan view of the machine 200 is illustrated, wherein the machine further comprises a first crimping member 250 and a second crimping member 252. The first crimping member 250 and the second crimping member 252 in one example are independently radially movable with respect to the axis 205. For purposes of clarity, FIG. 6 illustrates the machine 200 comprising the first crimping member 250 which is slidably coupled to the frame 203 via a first slide 253. A first actuator 254 is operable to selectively slide the first crimping member 250 radially with respect to the axis 205, whereby the first crimping member is operable to selectively fold and crimp the first flange 124 of the ring 112 onto the first end 120 of the cylindrical blade strip 114 via a first crimping wheel 255 when the blower wheel components rotate about the axis 205. Likewise, FIG. 5 illustrates a second actuator 256, operable to selectively slide the second crimping member 252 radially with respect to the axis 205 via a second slide 258, wherein the second crimping member is operable to fold and crimp the second flange 126 of the backplate 116 onto the second end 122 of the cylindrical blade strip 114 of FIG. 6. The second flange 126 is furthermore folded and crimped via a second crimping wheel 259, as illustrated in FIG. 5.

According to yet another aspect of the present invention, as illustrated in FIG. 4, one or more springs 260 are coupled to the second die 220, wherein the one or more springs compliantly permit an axial translation of the second die with respect to the upper portion 230 of the press 209. A spring constant K for the one or more springs 260 is selected during design of the machine 200 such that the one or more springs generally provide an axial compliance of the second die 220 with respect to the upper portion 230 of the press 209 when a first compressive force $F_1$ is exerted on the blower wheel components 110 via the press 209. The one or more springs 260 generally permit the first compressive force $F_1$ to axially retain the blower wheel components 110 between the first die 210 and the second die 220 during a crimping operation without causing a deformation of the blower wheel components. An axial translation of the second die 220 with respect to the upper portion of the press 209 is generally permitted, based on the compliance of the one or more springs 260.

According to another exemplary aspect of the present invention, the second die 220 further comprises a deforming member 270, wherein the deforming member resides on the second surface 228 of the second die 220. The deforming member 270 generally deforms a predetermined portion 271 of the hub 118 when a second compressive force $F_2$ is exerted on the blower wheel components 110 via the press 209. The selected spring constant K of the one or more springs 260 is furthermore selected such that the springs generally permits the second compressive force $F_2$ to axially translate the second die with respect to the upper portion 230 of the press 209, such that the deforming member 270 contacts the hub 118, and further deforms the predetermined portion 271 of the hub, thereby attaching the hub to the backplate 116.

According to another exemplary aspect of the invention, FIGS. 7A and 7B illustrate an exemplary hub 118, wherein the predetermined portion 271 comprises a cylindrical lip 300. Accordingly, the deforming member 270 of FIG. 4 is generally tapered, and is operable, for example, to engage an inner circumference 305 of the hub 118, such that the cylindrical lip 300 is deformed outward from the axis 205 when the second compressive force $F_2$ is applied. The deforming member 270 is operable to be axially translated toward the first die 210 via the press 209, thereby deforming the cylindrical lip 300 and attaching the hub 118 to the backplate 116 of FIG. 4. Alternatively, in accordance with another aspect of the present invention, FIGS. 8A and 8B illustrate another exemplary hub 118, wherein the predetermined portion 271 comprises a plurality of pips or lugs 315 which engage a plurality of holes (not shown) in the backplate 116 of FIG. 2. Accordingly, the deforming member 270 of FIG. 4 is operable to significantly compress the pips 315 of FIG. 8A, thereby generally deforming the pips, thus attaching the hub 310 to the backplate (not shown).

In accordance with yet another aspect of the present invention, the press 209 of FIG. 4 comprises a two-stage press 320. The two-stage press 320 is configured such that the first compressive axial force $F_1$ is applied to one or more of the blower wheel components 110 at a first pressure stage, and the second compressive axial force $F_2$ is exerted on one or more of the blower wheel components at a second pressure stage. The two-stage press 320 comprises, for example, an air-over-oil, pneumatic/hydraulic press comprising a piston (not shown) and a cylinder 325, wherein the piston is operable to translate within the cylinder by an application or removal of air pressure and/or oil pressure to or from the cylinder, respectively. According to one aspect of the present invention, air pressure is utilized to translate the piston (not shown) in the first pressure stage, wherein the first pressure stage generally provides the first compressive axial force $F_1$ (e.g., a clamping force) on the blower wheel components 110. In conjunction with the one or more springs 260, the first compressive axial force $F_1$ significantly maintains the axial and radial position of the blower wheel components 110 with respect to the first die 210 and the second die 220 without significantly deforming the blower wheel components.

In accordance with another aspect of the present invention, oil pressure is utilized to translate the piston (not shown) in the second pressure stage, wherein the second pressure stage generally provides a second compressive axial force $F_2$ (e.g., a deforming force) on the hub 118. In conjunction with the one or more springs 260, the second compressive force $F_2$ significantly deforms the predetermined portion 271 of the hub 118, whereby the hub is attached to the backplate 116 when the second compressive axial force $F_2$ is applied. The two-stage press 320, in conjunction with the one or more springs 260, generally permits the translation of the second die 220 with respect to the first die 210 using air pressure under relatively low pressure (e.g., under 70 psi), wherein a translation of the second die is permitted along the length L, while also generally permitting the first compressive axial force $F_1$ on the blower wheel components 110. The two-stage press 320 also generally permits a high pressure pressing operation via the second compressive axial force $F_2$ of the deforming member at relatively high pressure (e.g., 20,000 psi).

The machine 200 further comprises a control system 350 for controlling and actuating the drive motor 202, the press 209, the first crimping member 250, and the second crimping member 252. The control system, for example, comprises a programmable logic controller (PLC) which is adequately programmed such that the PLC is operable to control an actuation of the motor 202, the press 209, the first crimping member 250, and the second crimping member 252. According to another exemplary aspect, one or more electro-pneumatic pressure regulators (not shown) are utilized, in conjunction with the control system 350, to control an application of one or more of the air pressure and oil pressure to the press 209.

In accordance with one exemplary aspect of the invention, the control system 350 further comprises a pressure switch, timer, or other control mechanism such as an electro-pneumatic pressure regulator to actuate the two-stage press 320. For example, a timer is utilized to control the first compressive axial force $F_1$ for a predetermined time $T_1$, after which, the second compressive axial force $F_2$ is applied for another predetermined time $T_2$. According to another example, a pressure switch is utilized, wherein a signal is sent to the control system 350 if a predetermined pressure P is reached during the application of one or more of the first compressive axial force $F_1$ or the second compressive axial force $F_2$. According to another example, a pressure transducer is utilized to measure a pressure $P_M$ exerted between the first die 210 and the second die 220. The measured pressure $P_M$ can be utilized by the control system 350, for example, to determine whether a sufficient amount of pressure has been exerted on the hub 118 to indicate an acceptable deformation of the hub. In accordance with still another exemplary aspect of the present invention, a tachometer is utilized to measure a number of rotations of the first die 210 and the second die 220.

Figure 9:
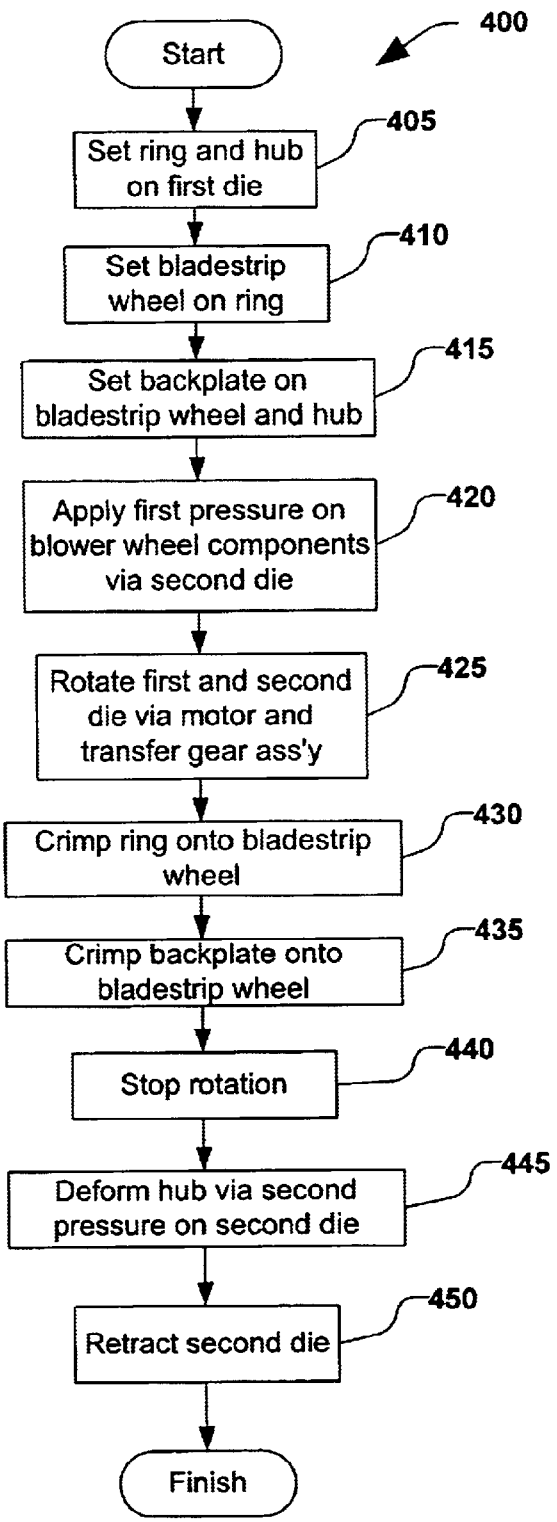
FIG. 9 is a flow chart illustrating a method for assembling a blower wheel according to the present invention.

FIG. 9 illustrates a method 400 for assembling a blower wheel according to the present invention. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the apparatus and systems illustrated and described herein as well as in association with other systems not illustrated.

The method 400 begins at step 405, wherein a ring and a hub are placed on a first die. A cylindrical blade strip is placed on the ring at step 410, and a backplate is placed on the cylindrical blade strip at step 415, wherein the hub slidingly engages one or more holes in the backplate. A second die is placed on the backplate and hub, and a first compressive axial force is applied to the second die at step 420. The first compressive axial force generally compresses the ring, cylindrical blade strip, and backplate between the first die and the second die. A rotational force is applied to the first die and the second die at step 425, wherein the first die and the second die are rotatably coupled by a transfer gear assembly. Since the rotational force applied to the second die is generally the same due to the transfer gear assembly, twisting of the cylindrical blade strip is substantially eliminated.

At step 430, a first radial crimping force is applied on the ring, wherein a first flange of the ring engages a first end of the cylindrical blade strip. A second radial crimping force is applied on the backplate at step 435, wherein a second flange on the backplate engages a second end of the cylindrical blade strip. The rotational force on the first die and the second die is generally stopped at step 440. At step 445, a second compressive axial force is applied on the second die without removing the first compressive axial force (in one example), wherein the hub is generally deformed on one end, thereby engaging the backplate. At step 450, the first compressive axial force and the second compressive axial force are removed.

Although the invention has been shown and described with respect to certain aspects, equivalent alterations and modifications will occur to others skilled in the art upon the reading and understanding of this specification and the annexed drawings. In particular regard to the various functions performed by the above described components (systems, devices, assemblies, etc.), the terms used to describe such components are intended to correspond, unless otherwise indicated, to any component which performs the specified function of the described component (i.e., that is functionally equivalent), even though not structurally equivalent to the disclosed structure that performs the function in the herein illustrated exemplary aspects of the invention. In addition, while a particular feature of the invention may have been disclosed with respect to only one of several aspects, such feature may be combined with one or more other features of the other aspects as may be desired and advantageous for any given or particular application. Furthermore, to the extent that the term "includes" is used in either the detailed description and the claims, such term is intended to be inclusive in a manner similar to the term "comprising."

What is claimed is:

1. A machine for assembling a blower wheel, the, blower wheel comprising a plurality of blower wheel components, wherein the blower wheel components comprise a ring, a cylindrical blade strip, a backplate, and a hub, the machine comprising:

a drive motor;

a first die having a first surface, whereon the blower wheel components reside, the first die rotatably coupled to the drive motor, wherein the drive motor is operable to rotate the first die about an axis;

a second die having a second surface oppositely disposed from the first surface of the first die, wherein the second surface is operable to engage one or more of the blower wheel components;

a transfer gear assembly rotatably coupled to the first die and the second die, wherein the transfer gear assembly is operable to generally transfer the rotation of the first die to the second die, thereby synchronizing the rotation of the first die and the second die;

a press coupled to the first die and the second die, wherein the second die is axially moveable with respect to the first die, and wherein the press is operable to compress the blower wheel components between the first die and the second die;

a first crimping member, wherein the first crimping member is radially moveable with respect to the first die, and wherein the first crimping member is operable to crimp a first flange on the ring onto a first end of the cylindrical blade strip when the press compresses the blower wheel components;

a second crimping member, wherein the second, crimping member is radially moveable with respect to the second die, and wherein the second crimping member is operable to crimp a second flange on the backplate onto a second end of the cylindrical blade strip when the press compresses the blower wheel components; and a control system for controlling the drive motor, the press, the first crimping member, and the second crimping member.

2. The machine of claim 1, wherein the second die further comprises a deforming member axially coupled thereto, wherein the deforming member is operable to axially translate with respect to the second die during compression, therein generally deforming a circumference of the hub and coupling the hub to the backplate.

3. The machine of claim 1, wherein the control system is further operable to control the deforming member.

4. The machine of claim 2, wherein the press further comprises a first pressure stage and a second pressure stage, wherein the first pressure stage exerts a first compressive axial force on one or more of the blower wheel components, and the second pressure stage exerts a second compressive axial force on one or more of the blower wheel components which is different than the first compressive axial force.

5. The machine of claim 4, wherein the first compressive axial force is exerted on the ring, cylindrical blade strip, and backplate.

6. The machine of claim 4, wherein the second compressive axial force is exerted on the backplate and the hub.

7. The machine of claim 4, wherein the second compressive axial force is greater than the first compressive axial force.

8. The machine of claim 4, wherein the press comprises an air-over-oil pneumatic/hydraulic piston and cylinder assembly, wherein air pressure is utilized within the cylinder to exert the first compressive axial force, and wherein oil pressure is utilized within the cylinder to exert the second compressive axial force.

9. The machine of claim 8, further comprising one or more pressure switches, wherein each pressure switch is operable to transmit a signal to the controller when the oil pressure or air pressure reach a predetermined limit.

10. The machine of claim 2, further comprising one or more electro-pneumatic pressure regulators operable to control one or more of the first compressive axial force and the second compressive axial force.

11. The machine of claim 2, further comprising one or more pressure transducer, wherein each pressure transducer is operable to sense a pressure exerted on the blower wheel components from the first compressive axial force or the second compressive axial force.

12. The machine of claim 11, wherein the pressure transducer is electrically connected to the control system, and wherein the pressure transducer is operable to transmit the sensed pressure from the first compressive axial force or the second compressive axial force to the control system.

13. The machine of claim 1, further comprising a spring having a predetermined compliance, the spring coupled to the second die, wherein the spring generally permits a predetermined axial translation of the second die with respect to the press.

14. The machine of claim 1, wherein the first die and the second die accommodate a plurality of different hub dimensions.

* * * * *